(12) United States Patent
Dever et al.

(10) Patent No.: US 7,925,890 B2
(45) Date of Patent: Apr. 12, 2011

(54) NETWORK CENTERED RECOVERY PROCESS FOR CRYPTOGRAPHIC PROCESSING MODULES

(75) Inventors: Donald J. Dever, Webster, NY (US); Ian D. Mann, Honeye, NY (US)

(73) Assignee: Harris Corporation, Melbourne, FL (US)

( * ) Notice: Subject to any disclaimer, the term of this patent is extended or adjusted under 35 U.S.C. 154(b) by 1027 days.

(21) Appl. No.: 11/551,746

(22) Filed: Oct. 23, 2006

(65) Prior Publication Data

US 2008/0098235 A1 Apr. 24, 2008

(51) Int. Cl.
*G06F 11/30* (2006.01)

(52) U.S. Cl. ........ 713/189; 713/190; 713/191; 713/192; 713/193; 713/194; 380/43; 380/28; 380/277

(58) Field of Classification Search .................. None
See application file for complete search history.

(56) References Cited

U.S. PATENT DOCUMENTS

| 4,203,166 | A | * | 5/1980 | Ehrsam et al. ............... 380/45 |
| 4,771,461 | A | | 9/1988 | Matyas |
| 5,745,576 | A | | 4/1998 | Abraham et al. |
| 5,937,066 | A | * | 8/1999 | Gennaro et al. ............... 380/286 |
| 5,961,626 | A | | 10/1999 | Harrison et al. |
| 6,151,677 | A | | 11/2000 | Walter et al. |
| 2005/0138403 | A1 | | 6/2005 | Volp et al. |
| 2005/0185790 | A1 | | 8/2005 | Le Quere |
| 2006/0236129 | A1 | * | 10/2006 | Mimatsu ..................... 713/193 |
| 2007/0226786 | A1 | * | 9/2007 | Berger et al. ................... 726/9 |

* cited by examiner

*Primary Examiner* — Taghi T Arani
*Assistant Examiner* — Amir Mehrmanesh
(74) *Attorney, Agent, or Firm* — Fox Rothschild, LLP; Robert J. Sacco

(57) ABSTRACT

A method is provided for re-initializing a cryptographic processing module (102) at a location designated as an unclassified environment. The method includes storing in a database (122) a module unique recovery vector (310, 510) assigned to a cryptographic processing module. The method also includes indexing the module unique recovery vector in the database using a unique module identifying code (for example, a serial number) assigned to the cryptographic processing module. The method further includes subsequently communicating the module unique recovery vector from the database, over a computer network (120), to a remote computing environment (400) that is unclassified. The module unique recovery vector is used to re-initialize the cryptographic processing module.

12 Claims, 5 Drawing Sheets

US 7,925,890 B2

NETWORK CENTERED RECOVERY PROCESS FOR CRYPTOGRAPHIC PROCESSING MODULES

BACKGROUND OF THE INVENTION

1. Statement of the Technical Field

The invention concerns devices for securing transmitted data in radio communications, telecommunication, and voice over internet protocol communications. More particularly, the invention concerns a cryptographic processing module having a network centered recovery process.

2. Description of the Related Art

A cryptographic processing module (sometimes referred to as a programmable encryption module) is a device for securing transmitted data in a radio communication, a telecommunication, a voice over internet protocol communication, and/or other network communications. The cryptographic processing module requires cryptographic initialization to provide full functionality to a user. Cryptographic initialization refers to the conventional process by which one or more initialization vectors are provided to a cryptographic processing module so that the module can perform cryptographic processing. An initialization vector is defined in this context to be one or more blocks of data that when properly implemented enable full funtionality of a crytographic processing module. Without such an initialization vector, a cryptographic processing module will not function at full capability.

Typically, this cryptographic initialization is performed at a factory facility or at some other high level customer assembly or maintenance facility before the unit is deployed as part of a communication system. After the unit is deployed however, there are various situations that can arise which result in the need to once again perform a cryptographic initialization. For example, as a consequence of performing maintenance on the cryptographic processing module, the module's information security related functions could be disabled. Subsequently, the cryptographic processing module would need to be re-initialized to once again provide full system functionality to a user.

In general, the cryptographic initialization process requires appropriately approved classified locations and cleared personnel in order to maintain the cryptographic processing modules. The need for such classified locations and cleared personnel does not present a significant problem at factory facilities or other high level maintenance facilities. However, it is often inconvenient to provide such capabilities at customer production facilities. Likewise, there can be difficulties with providing such capabilities at end user field maintenance locations, which are often operated in remote or even hostile environments. For example, the necessity of having appropriately approved classified locations is costly. Furthermore, this approach requires the use of cleared personnel who are in short supply.

In view of the foregoing, there remains a need for a module re-initialization method that can be performed outside of a classified environment. Also necessary is a method that provides a global maintenance approach to module re-initialization through the use of a network, such as an Internet or an Intranet, thereby providing a cost effective approach.

SUMMARY OF THE INVENTION

The invention concerns a method for re-initializing a cryptographic processing module at a location designated as an unclassified environment. The method includes storing a module unique recovery vector in a database. The module unique recovery vector is a recovery vector that has been assigned to a particular cryptographic processing module. The module unique recovery vector is indexed in the database using a unique module identifying code assigned to the particular cryptographic processing module (for example, a serial number). Subsequently, the module unique recovery vector is communicated from the database, over a computer network, to a remote computing environment that is unclassified. The module unique recovery vector is used to re-initialize the cryptographic processing module.

According to an aspect of the invention, the method further includes generating the module unique recovery vector in a classified or an unclassified computing environment. The module unique recovery vector is generated in both a cryptographic initialization process and a cryptographic re-initialization process. It should be understood that the cryptographic initialization process is exclusinvely responsive to receipt of one or more initialization vectors.

According to another aspect of the invention, the cryptographic initialization process further includes generating a module unique data required for initializing the cryptographic processing module. The module unique data is stored in the memoty of the cryptographic processing module. The module unique data is used to re-initialize the cryptographic processing module.

According to another aspect of the invention, the module unique recovery vector is communicated from the database, at least partly over a world-wide computer network, to a remote computing environment that is unclassified. The module unique recovery vector may be encrypted prior to being communicated from the database to the remote computing environment.

According to another aspect of the invention, the unique module identifying code is obtained by querying a memory of the cryptographic processing module. According to yet another aspect of the invention, the unique module identifying code is communicated from the remote computing environment to the server associated with the database. This communication of the unique module identifying code is performed at least partly over a world-wide computer network (such as a wide area network). The unique module identifying code may be encrypted prior to being communicated to the database.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention will now be described more fully hereinafter with reference to accompanying drawings in which illustrative embodiments of the invention are shown. This invention may, however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

It should be appreciated that the present invention provides methods, systems, and apparatus relating to an initialization process of a cryptographic processing module. Accordingly, an embodiment including the listed functions is discussed in further below (in relation to FIG. 1 through FIG. 5).

Figure 1:
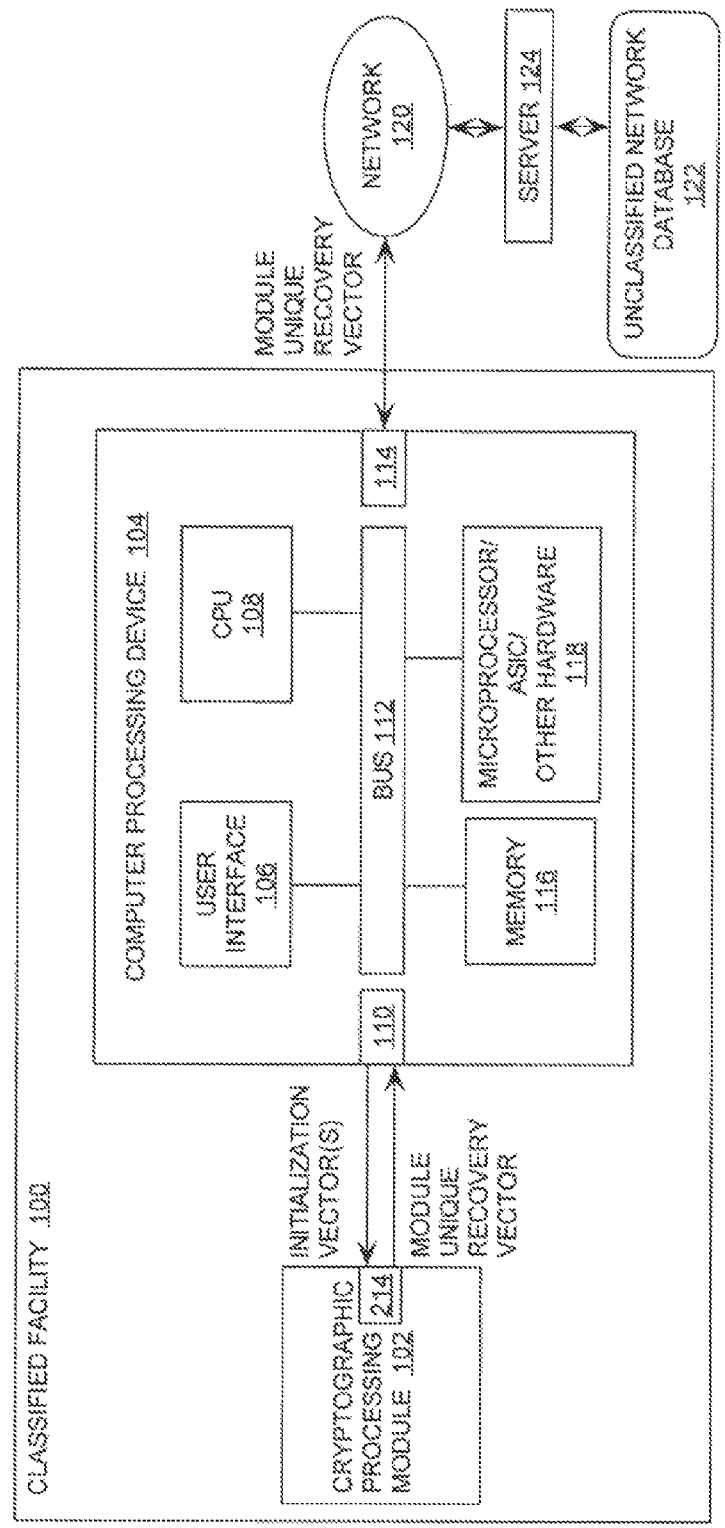
FIG. 1 is a hardware block diagram of a classified facility coupled to a network that is useful for understanding the invention.

Referring now to FIG. 1, there is provided a hardware block diagram of a classified facility 100 coupled to a computer network 120 that is useful in understanding the invention. The classified facility 100 is designated a security classified environment. This means that the facility satisfies certain government standards for handling of materials which are deemed to have a security classification, such as SECRET. For example, physical access to the facility is generally restricted to those having appropriate security clearances. The facility can also be required to have certain physical and technical features, such as electromagnetic shielding, which are provided to limit unauthorized access to information concerning the data processing and data stored at the facility. As shown in FIG. 1, the classified facility 100 is comprised of a cryptographic processing module (CPM) 102 and a computer processing device 104. The CPM 102 is a programmable module that performs actions involving initialization, integrity, authentication, encryption, and decryption. The CPM 102 will be described in detail below in relation to FIG. 2.

The computer processing device 104 is a computer workstation, desktop personal computer system, a laptop personal computer system, or any other general purpose computer processing device. As such, the computer processing device 104 is comprised of a system interface 114, a data interface 110, a user interface 106, a central processing unit 108, a system bus 112, a memory 116 connected to and accessible by other portions of the computer processing device 104 through system bus 112, and hardware entities 118 connected to system bus 112. The computer processing device 104 is coupled to the CPM 102 through the data interface 110. The data interface 110 sends data (for example, one or more initialization vectors) to the CPM 102. For example, the initialization vectors can be transmitted serially over a serial data buys. The data interface 110 also receives data (for example, a module unique recovery vector) sent from the CPM 102. According to an aspect of the invention, the data interface 110 is a RS232 interface. RS232 interfaces are well known to persons skilled in the art. Thus, RS232 interfaces will not be described in great detail herein. However, it should be appreciated that the invention is not limited in this regard and any data interface known in the art can be used without limitation.

At least some of the hardware entities 118 and CPU 108 perform actions involving access to and use of memory 116, which may be a RAM, a disk drive, and/or other forms of program bulk-storage. The hardware entitities 118 may include microprocessors, ASICs, and other hardware. The CPU and/or hardware entities 118 can include a microprocessor programmed for generating or retrieving from a memory location at least one initialization vector, storing the at least one initialization vector in memory 116, and communicating the at least one initialization vector to the CPM 102 during an initialization process (described below in relation to FIG. 3) or a re-initialization process (described below in relation to FIG. 5).

The CPU 108 and/or hardware entitities 118 may also include a microprocessor programmed for receiving a module unique recovery vector from the CPM 102 and forwarding the module unique recovery vector to server 124 for storage in the unclassified network database 122. The CPU 108 and/or hardware entities 118 may further include a microprocessor programmed for querying the unclassified network database 122 for the module unique recovery vector, receiving the module unique recovery vector from the unclassified network database 122, and forwarding the module unique recovery vector to the CPM 102 during an initialization or a re-initialization process.

The system interface 114 communicates outputs from the computer processing device 104 to the server 124, through the computer network 120. The system interface 114 also receives outputs from the server 124, through the computer network 120. In this regard, the system interface 114 is coupled to the server 124 through the computer network 120, which can be a wide area network (WAN), or a local area network (LAN), an Internet, or an Intranet. The server 124 is coupled to the unclassified network database 122.

The unclassified netowrk database 122 provides a data store for the CPM 102 re-initialization data (such as a module unique recovery vector). It should be understood that the CPM 102 re-initialization data can be stored encrypted or decrypted in the unclassified network database 122. It should be further understood that the CPM 102 re-initialization data can be indexed in the unclassified network database 122 using a unique module identifying code (for example, a serial number) that is assigned to the CPM 102. It should be noted that the use of an unclassified database is acceptable for storage of the re-initialization data because such data is unique to a particular CPM 102. As such, it is generally not useful except to someone actually in posession of the particular CPM 102 corresponding to that particular re-initialization data. This is unlike the situation with an original initialization vector or vectors, which have broader acclicability to a wider range of devices. Still, it will be appreciated that it can be advantageous to store the data in the unclassified network database 122 in an encrypted form so as to minimize any security risk associated with the storage of such data.

The user interface 106 facilitates a user action to access and control a software application. In this way, the software application can be used for generating or accessing from memory 116 at least one initialization vector. The software application can also be responsive to other user actions for storing the at least one initialization vector and sending the at least one initialization vector to the CPM 102. The user interface 106 also facilitates a user action to create a request to access a software application for receiving a CPM 102 re-initialization data and forwarding the CPM 102 re-initialization data to the server 124 for storage in the unclassified network database 122. The user interface 106 may comprise a display screen and an input means, such as a keypad, a directional pad, and/or a directional knob.

Those skilled in the art will appreciate that the hardware architecture illustrated in FIG. 1 is one possible example of a hardware architecture that can be used in accordance with the present invention. However, the invention is not limited in this regard and any other suitable hardware architecture having a classified facility coupled to an unclassified network database can also be used without limitation.

Figure 2:
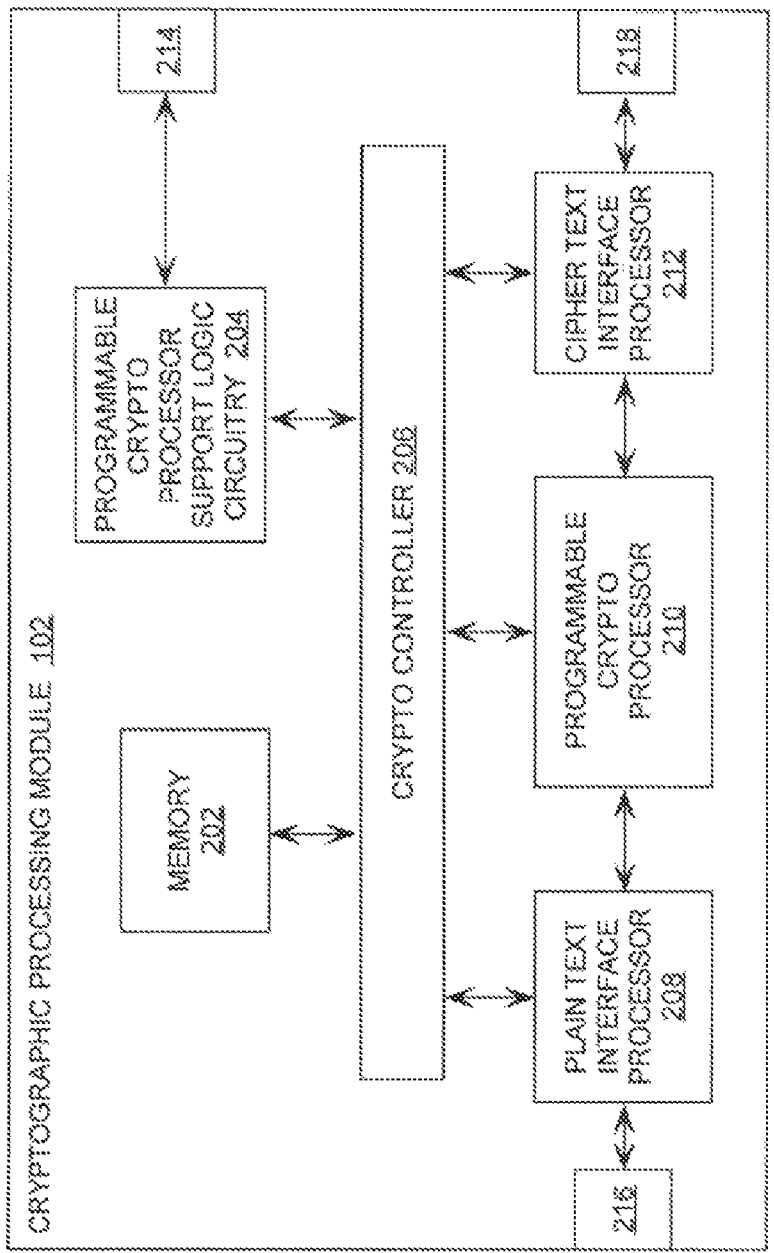
FIG. 2 is a hardware block diagram of a cryptographic processing module shown in FIG. 1 that is useful for understanding the invention.

Referring now to FIG. 2, ther is provided a hardware block diagram of the programmable CPM 102 of FIG. 1. It should be understood that the hardware block diagram shown is merely an example of a possible architecture for a CPM 102. Those skilled in the art will readily appreciate that a CPM 102 can have other architectures. Such other architectures can also be used with the present invention without limitation, provided that they have similar requirements and behavior with regard to initialization and re-initialization processes as described herein. Accordingly, the invention is not intended to be limited to the CPM architecture shown in FIG. 2.

As shown in FIG. 2, the CPM 102 is comprised of a memory 202, a programmable crypto processor support logic circuitry (PCPSLC) 204, a crypto ckontroller 206, a plain text interface processor (PTIP) 208, a programmable crypto processor (PCP) 210, and a cipher text interface processor (CTIP) 212. The memory 202 provides a storage device for module data, such as one or more initialization vectors and/or a module unique data. The memory 202 can be a RAM, a disk drive, and/or other forms of program bulk-storage. The memory 202 is coupled to the crypto controller 206. The crypto controller 206 performs program management for the CPM 102. In this regard, the crypto controller 206 is coupled to the PCP 210, the PCPSLC 204, the PTIP 208, and the CTIP 212.

The PCP 210 performs actions involving the execution of cryptographic processing programs. The PCP 210 also performs actions involving a cryptographic initialization process (described below in relation to FIG. 3) and a cryptographic re-initialization process (described below in relation to FIG. 5).

The PCPSLC 204 includes hardware and software for verifying the CPM's 102 operating conditions and key management functions (such as, an opertional key fill function). The PCPSLC 204 is coupled to a PCPSLC interface port 214 for the flow of data between the PCPSLC 204 and an external device. For example, CPM 102 can be coupled to computer processing device 104. Specifically, interface 214 can be coupled to interface 110 via a data bus such that initialization vectors can be communicated from computer processing device 104 to the CPM 102.

THe PTIP 206 and the CTIP 212 provide external interfaces and signaling for the CPM 102. In this regard, the PTIP 208 is coupled to a plain text interface port 216 for the flow of data between the PTIP 208 and an external device. The CTIP 212 is coupled to a cipher text interface port 218 for the flow of data between the CTIP 212 and an external device.

A person skilled in the art will appreciate that the CPM 102 is typically initialized upon being deployed in a communications system. This initialization proces is performed for the activation of information security (INFOSEC) related functions. Cryptographic initialization refers to the conventional process by which one or more initialization vectors are provided to a CPM 102 so that CPM 102 can perform cryptographic processing. An initialization vector is defined in this context to be one or more blocks of data that when properly implemented enable full funtionality of a cryptographic processing. Without such an initialization vector, a CPM 102 will not function at full capacity. A process for initializing a CPM 102 is described below in relation to FIG. 3.

Figure 3:
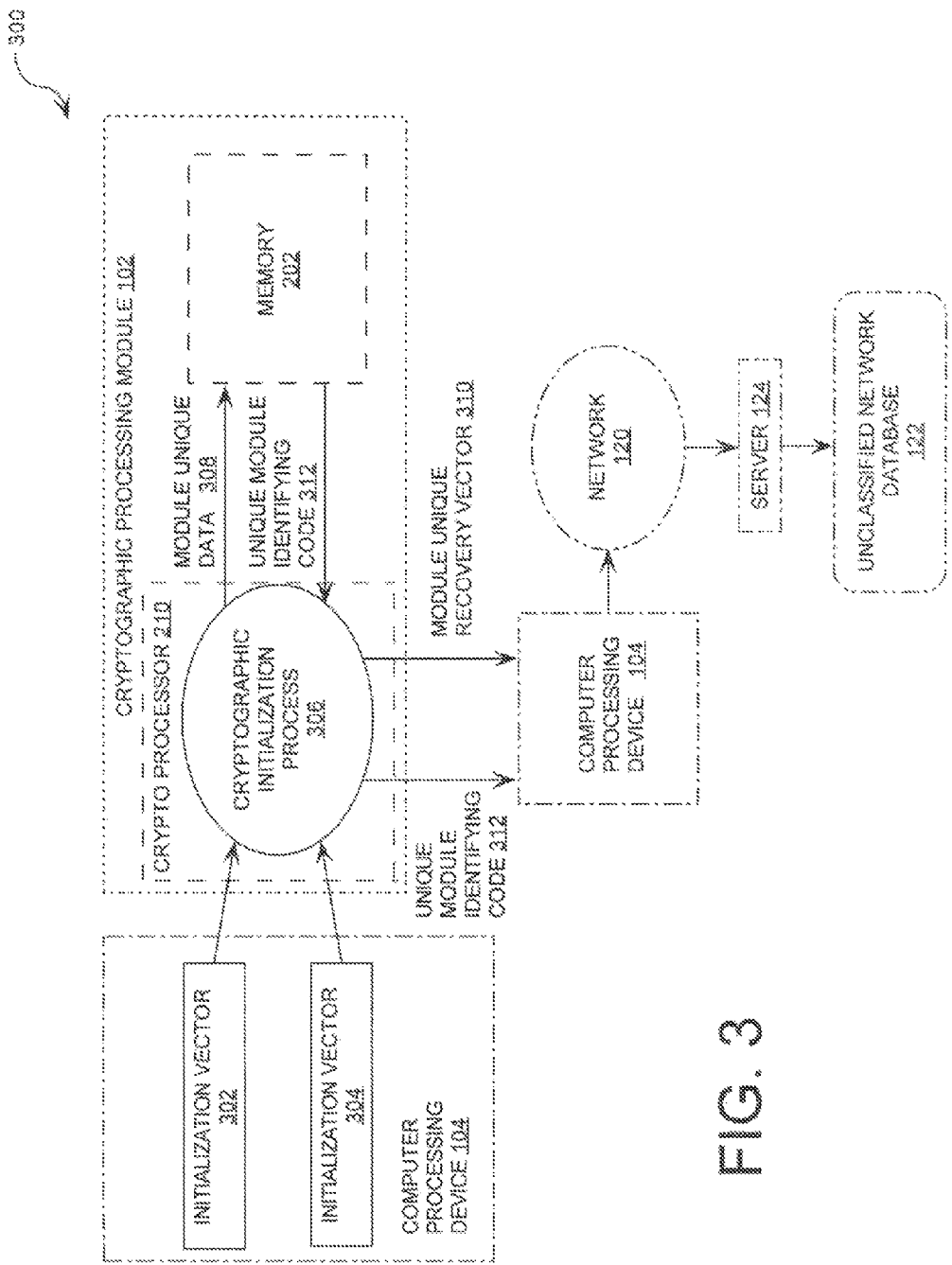
FIG. 3 is a schematic illustration of an initialization process for the cryptographic processing module of FIGS. 1 and 2 that is useful in understanding the invention.

Referring to FIG. 3, there is provided a schematic illustration of an initialization process 300 for a CPM 102. It should be understood that the entire initialization process 300 is performed by personnel having an appropriate security clearance level, such as SECRET, in the classified facility (described above in relation to FIG. 1).

As shown in FIG. 3, the initialization process 300 includes the transmission of initialization vectors 302, 304, to the CPM 102. Upon receipt of the initialization vectors 302, 304, a cryptographic initialization process 306 is performed by the crypto processor 210. In this regard, it should be appreciated that the cryptographic initialization process 306 can be designed such that it is exclusively responsive to receipt of the initialization vectors 302, 304. This cryptographic initialization process 306 can be selected in accordance with a Department of Defense Type 1 encryption. The cryptographic initialization process 306 is well known to persons skilled in the art. Thus, the cryptographic initialization process 306 will not be described in great detail herein.

According to one embodiment of the invention the CPM 102 generates recovery information as part of the initialization of the module. This recovery information includes a module unique recovery vector 310 and a module unique data 308. The module unique data 308 is automatically stored in the CPM 102 during the initialization process. The module unique recovery vector 310 is output from the CPM module. The combination of these two items can be use to re-initialize the CPM 102 at some future time. However, it should be understood that the module unique recovery vector 310 and the module unique data 308 are valid only for only one re-initialization, and only for the particular CPM 102 that originally generated them. For example, the foregoing features are provided by a Sierra II type CPM, which is available from Harris Corporation of Melbourne, Fa.

Accordingly, the cryptographic initialization process 306 advantageously includes generating module unique data 308 and module unique recovery vector 310 (for example, a cryptographic initialization key (CIK) data) using the initialization vectors 302, 304. The module unique data 308 is stored in memory 202. The module unique recovery vector 310 is automatically stored in the unclassified network database 122 for use in a subsequent re-initialization process (described below in relation to FIG. 5). It should be understood that the module unique recovery vector 310 can be encrypted prior to being communicated by the CPM 102 to the server 124 for storage in the unclassified network database 122.

According to an aspect of the invention, the module unique recovery vector 310 is indexed in the unclassified network database 122 using a unique module identifying code 312 (for example, a serial number) that is assigned to the CPM 102. In this regard, the cryptographic initialization process can include processing performed by the crypto processor 210 to query memory 202 for a unique module identifying code 312 (such as a serial number). The processing can also include encrypting the unique module identifying code 312. Subsequently, the encrypted unique module identifying code 312 can be communicated to server 124 for use in indexing one or more tables of the unclassified network database 122. The particular indexing process used in the foregoing step is not critical. All that is necessary is that the indexing process provides some method for identifying and accessing the module unique recovery vector 310 for a particular CPM 102 based on the unique module identifying code 312.

Those skilled in the art will appreciate that the initialization process 300 illustrated in FIG. 3 is one possible example of an initialization process that can be used in accordance with the present invention. However, the invention is not limited in this regard and any other suitable initialization process can also be used without limitation provided that a module unique recovery vector is indexed in an unclassified network database based on a unique module identifying code.

Figure 4:
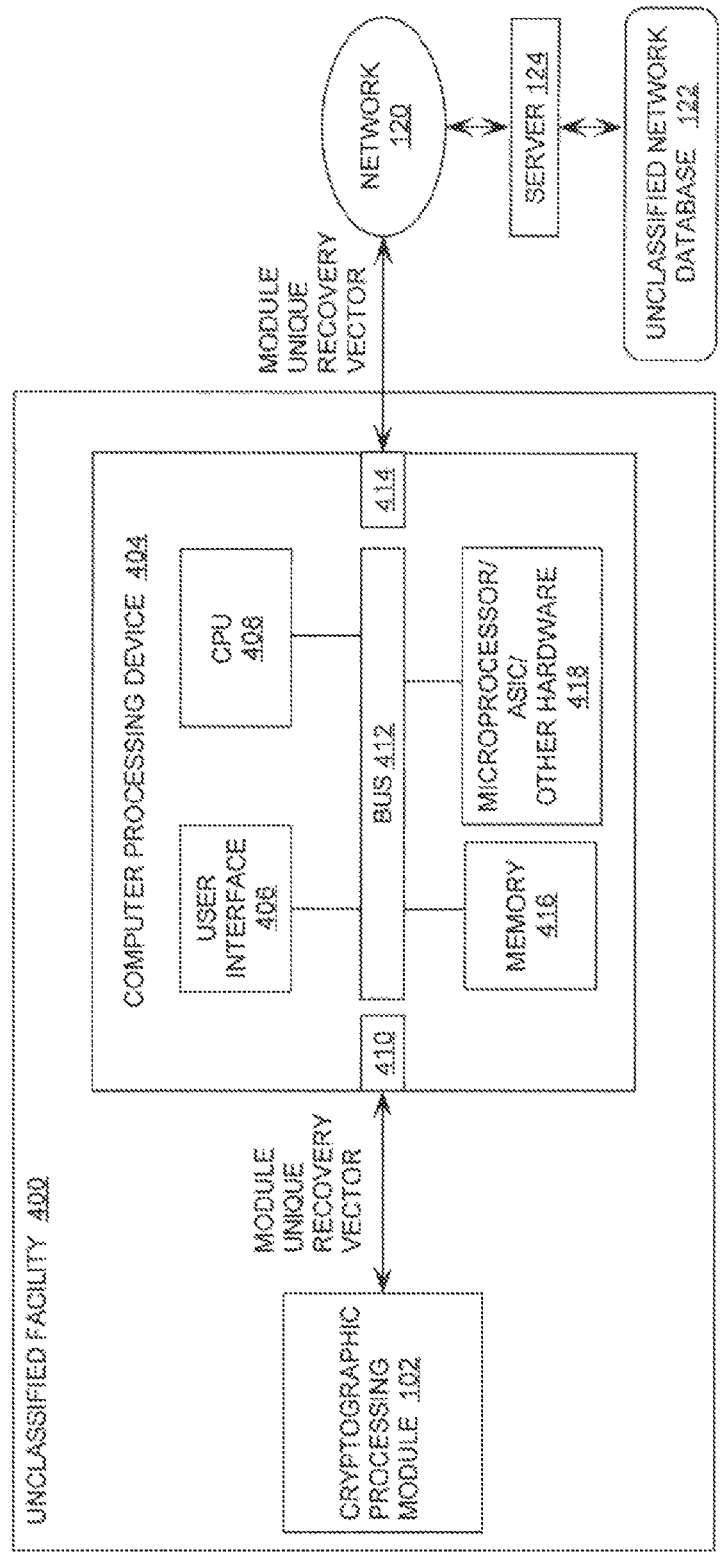
FIG. 4 is a hardware block diagram of an unclassified facility coupled to a network that is useful for understanding the invention.

Referring now to FIG. 4, there is provided a hardware block diagram of an unclassified facility 400 coupled to a computer network 120 that is useful for understanding the invention. It should be appreciated that the unclassified facility 400 is designated as an unclassified environment. This means that the facility does not need to conform to the physical and technical requirements of a security classified computing facility. It also means that the personnel who access such facility do not need to have a security clearnce. This can be a great cost saving advantage for maintenance facilities and customer assembly facilities.

As shown in FIG. 4, the unclassified facility 400 is comprised of a CPM 102 which required re-initialization and a computer processing device 404. The description above (in relation to FIGS. 1 and 2) will suffice with respect to the CPM 102. However, those skilled in the art will appreciate that the CPM architecture illustrated in FIG. 2 is one possible example of a cryptographic module in which a cryptographic re-initialization process can be performed. In this regard, it should be understood that any other sitable CPM architecture can also be used without limitation.

Referring again to FIG. 4, the computer processing device 404 is a workstation, desktop personal computer system, a laptop personal computer system, or any other general purpose computer processing device. As such, the computer processing device 404 is comprised of a system interface 414, a data interface 410, a user interface 406, a contral processing unit 408, a system bus 412, a memory 416 connected to and accessible by other portions of the computer processing device 404 through system bus 412, and hardware entities 428 connected to system bus 412. The computer processing device 410 is used to send data (for example, a module unique recovery vector) to the CPM 102. The data interface is also used to receive data (for example, a new module unique recovery vector) from the CPM 102.

According to an aspect of the invention, the data interface 410 is a RS232 interface. RS232 interfaces are well known to persons skilled in the art. Thus, RS232 interfaces will not be described in great detail herein. However, it should be appreciated that the invention is not limited in this regard and any data interface known in the art can be used without limitation.

The CPU 408 and at least some of the hardware entities 418 perform actions involving access to and use of memory 416, which may be a RAM, a disk driver, and/or other forms of program bulk storage. The hardware entities 418 may include microprocessors, ASICs, and other hardware. THe CPU 408 and/or hardware entities 418 may include a microprocessor programmed for communicating data (for example, a module unique recovery vector) to and from the server 124 and unclassified network database 122, over a computer network 120. For example such communications can occur as part of a cryptographic re-initialization process for CPM 103 (described below in relation to FIG. 5). In this regard, the CPU 408 and/or hardware entities 418 may include a microprocessor programmed for receiving data from the CPM 102, generating a message including a query for specific data stored in the unclassified network database 122 from the CPM 102, and forwarding the message to the unclassified network database 122 through the computer network 120. The CPU 408 and/or hardware entities 418 may further include a microprocessor programmed for receiving data from the unclassified network database 122 and communicating the received data to the CPM 102.

The system interface 414 receives and communicates inputs and outputs from the computer processing device 404 and the computer network 120. The description above (in relation to FIG. 1) will suffice with respect to the computer network 120, the server 124, and the unclassified network database 122. The user interface 406 facilitates a user action to communicate a request to access a software application for re-initializing the CPM 102.

Those skilled in the art will appreciate that the hardware architecture illustrated in FIG. 4 is one possible example of a hardware architecture that can be used in accordance with the present invention. However, the invention is not limited in this regard and any other suitable hardware architecture having an unclassified facility coupled to an unclassified network database can also be used without limitation.

It should be understood that the CPM 102 may require maintenance (such as a component replacement and/or a component repair) during its useful life. Such maintenance could result in a disablement of the INFOSEC functions. In such a scenario, the CPM 102 is re-initialized to re-enable the INFOSEC functions. A process used for such a re-initialization of the CPM 102 is described below in relation to FIG. 5.

Figure 5:
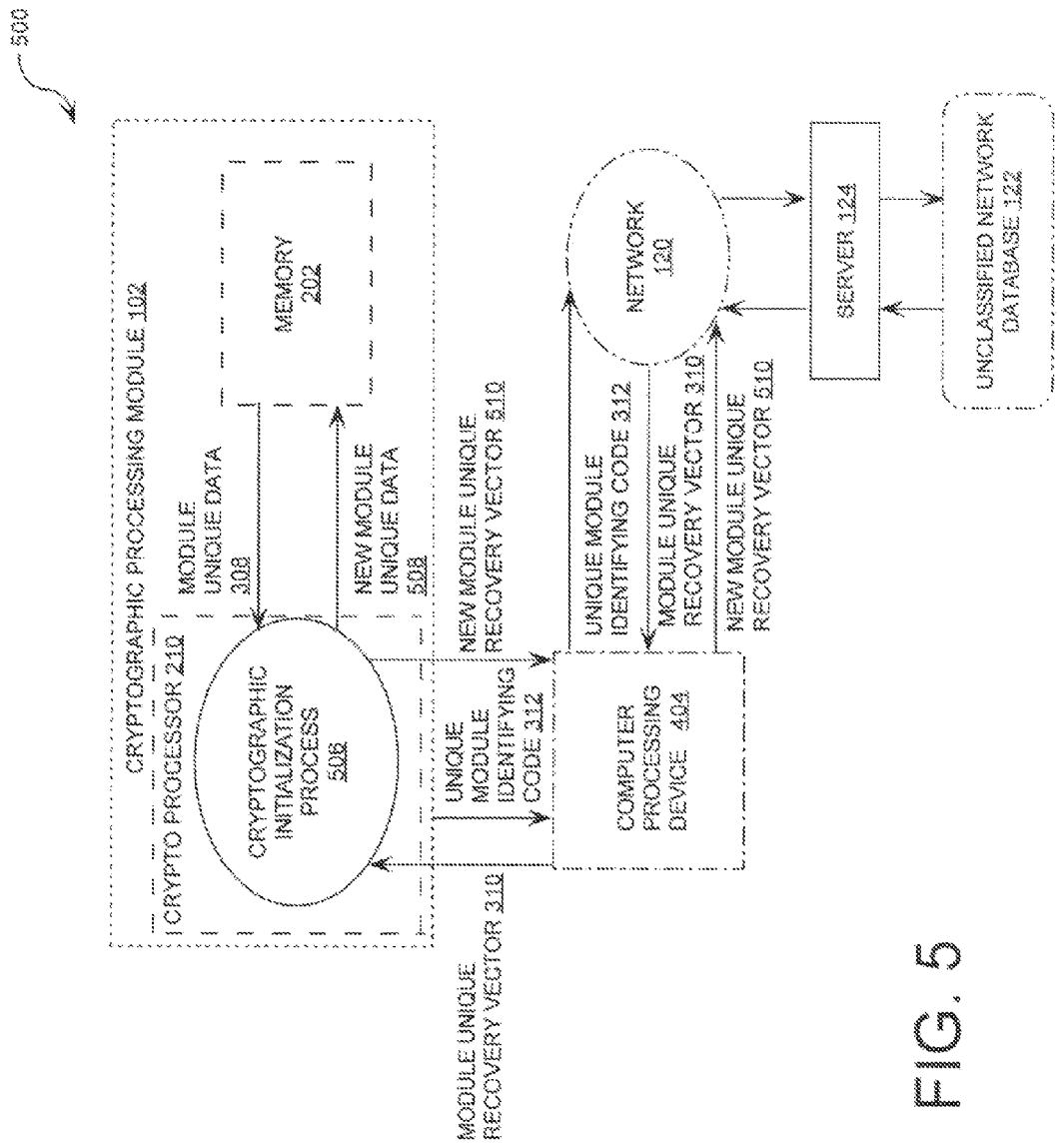
FIG. 5 is a schematic illustration of a re-initialization process for the cryptographic processing module of FIGS. 1 and 2 that is useful in understanding the invention.

Referring now to FIG. 5, there is provided a schematic illustration of a re-initialization process 500 for a CPM (such as that shown in FIG. 1, FIG. 2, and FIG. 4) that is useful for understanding the invention. It should be understood that the entire re-initialization process 500 is performed in an unclassified environment, such as the unclassified facility of FIG. 4.

As shown in FIG. 5, the re-initialization process 500 includes processing performed by the crypto processor 210 and computer processing device 404. The re-initialization process can begin by providing computer processing device 404 with a unique module identifying code 312. This information can be obtained by any suitable means. For example, the unique module identifying code 312 can be physically inscribed or displayed on a CPM 102. Alternatively, the computer processing device 404 can access the unique module identifying code 312 by querying the CPM 102. In response, the CPM 102 can provide its unique module identifying code 312. For example, the unique module identifying code 312 can comprise a serial number for the CPM.

Once the computer processing device 404 has obtained the unique module identifying code 312 for CPM 102, the computer processing device 404 can provide this information to the server 124 using the network 120. The server 124 will use the unique module identifying code 312 to locate the module unique recovery vector 310 associated with the particular CPM 102. Since the module unique recovery vector 310 is indexed based on the unique module identifying code 312, the module unique recovery vector 310 can be easily located. Once the module unique recovery vector 310 has been obtained by server 124, it can be communicated to the computer processing device 404 using network 120.

As illustrated in FIG. 5, the module unique recovery vector 310 is commuicated from the computer processing device 404 to the cryptographic processing module 102. The crypto processor 210 accesses from memory 202 the module unique data 308 that was generated as part of the original initialization process. Thereafter, crypto processor 210 completes the re-initialization in cryptographic initialization process 506 using the module unique recovery vetor 310 and the module unique data 308. THe cryptographic initialization process 506 is well known to persons skilled in the art. Thus, the cryptographic initialization process will not be described in great detail herein.

However, it should be understood that the cryptographic initialization process 506 includes generating a new module unique data 508 and a new module unique recovery vector 510 (for example, a cryptograhic initialization key (CIK) data) using the module unique data 308 and the module unique recovery vector 310. The new module unique data 508 is stored in memory 202. The new module unique recovery vector 510 is communicated to the computer processing device 404. Thereafter, computer processing device 404 communicates the new module unique recovery vector 410 to the server 124. This new module unique recovery vector can advantageously be provided to the server 124 together with the unique module identifying code 312 (such as the serial number of CPM 102). Thereafter, the server 124 uses this information to store the new module unique recovery vector 510 in the unclassified network database 122. The new module unique recovery vector 510 is indexed in the unclassified network database 122 based on the unique module identifying code 312 assigned to CPM 102. The previously stored module unique recovery vector 310 can now be discarded since it is no longer valid.

It should be understood that a module unique data 308, 508 and a module unique recovery vector 310, 510 are valid for only one (1) re-initialization process. As such, each time the CPM 102 is re-initialized a new module unique data and a module unique recovery vector is generated and stored for later use in a subsequent re-initialization process.

Those skilled in the art will appreciate that the re-intializaiton process 500 illustrated in FIG. 5 is one possible example of a re-initialization process that can be used in accordance with the present invention. However, the invention is not limited in this regard and any other suitable re-initialization process can also be used without limitation provided that a module recovery vector is retrieved from an unclassified network database and a new module recovery vector is stored in the unclassified network database.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for re-initializing a cryptographic processing module, comprising:
   generating recovery information, at said cryptographic processing module located in a classified environment, that includes a module unique recovery vector and module unique data;
   communicating said module unique recovery vector from said classified environment, over a computer network, to an unclassified network database;
   storing in said unclassified network database said module unique recovery vector defining first re-initialization data that is required for re-activating previously deactivated information security functions of said cryptographic processing module at a future time and is functional only with one said cryptographic processing module for which it was uniquely generated;
   indexing said module unique recovery vector in said unclassified network database using a unique module identifying code that identifies said cryptographic processing module;
   relocating said cryptographic processing module from said classified environment to an unclassified environment;
   subsequent to said relocation, communicating said module unique recovery vector from said unclassified network database, over said computer network, to said unclassified environment; and
   using said module unique data and said module unique recovery vector provided from said unclassified network database to re-initialize said cryptographic processing module in said unclassified environment;
   wherein said module unique data defines second re-initialization data that is required for re-activating said previously deactivated information security functions of said cryptographic processing module and is unique to said cryptographic processing module.

2. The method according to claim 1, further comprising generating a new module unique recovery vector in said unclassified environment.

3. The method according to claim 1, further comprising generating said module unique recovery vector in a cryptographic initialization process exclusively responsive to receipt of at least one initialization vector.

4. The method according to claim 1, further comprising storing said module unique data in a storage device of said cryptographic processing module.

5. The method according to claim 1, further comprising encrypting said module unique recovery vector prior to said communicating step.

6. The method according to claim 1, further comprising querying said cryptographic processing module in said unclassified environment to obtain said unique module identifying code.

7. The method according to claim 1, further comprising communicating said unique module identifying code from said unclassified environment to a server associated with said unclassified network database.

8. The method according to claim 7, further comprising encrypting said unique module identifying code prior to communicating said unique module identifying code.

9. A method for re-initializing a cryptographic processing module, comprising:
   generating recovery information, at said cryptographic processing module located in a classified environment, that includes a module unique recovery vector and module unique data;
   communicating said module unique recovery vector from said classified environment, over a computer network, to an unclassified network database;
   storing in said unclassified network database said module unique recovery vector defining first re-initialization data that is required for re-activating previously deactivated information security functions of said cryptographic processing module at a future time and is functional only with one said cryptographic processing module for which it was uniquely generated;
   querying said cryptographic processing module to obtain a unique module identifying code that is assigned only to said cryptographic processing module;
   communicating said unique module identifying code to said unclassified network database;
   indexing said module unique recovery vector in said unclassified network database using said unique module identifying code;
   relocating said cryptographic processing module from said classified environment to an unclassified environment;
   subsequent to said relocation, communicating said module unique recovery vector from said unclassified network database, over a computer network, to said unclassified environment; and
   using module unique data and said module unique recovery vector provided from said unclassified network database to re-initialize said cryptographic processing module in said unclassified environment;

wherein said module unique data defines second re-initialization data that is required for re-activating said previously deactivated information security functions of said cryptographic processing module and is unique to said cryptographic processing module.

10. The method according to claim 9, further comprising generating a new module unique recovery vector in said unclassified environment.

11. The method according to claim 9, further comprising generating said module unique recovery vector in a cryptographic re-initialization process exclusively responsive to receipt of at least one initialization vector.

12. A method for re-initializing a cryptographic processing module, comprising:
  generating recovery information, at said cryptographic processing module located in a classified environment, that includes a module unique recovery vector and module unique data;
  communicating said module unique recovery vector from said classified environment, over a computer network, to an unclassified network database;
  storing in said unclassified network database said module unique recovery vector defining first re-initialization data that is required for re-activating previously deactivated information security functions of said cryptographic processing module at a future time and is functional only with one said cryptographic processing module for which it was uniquely generated;
  querying said cryptographic processing module to obtain a unique module identifying code that is assigned only to said cryptographic processing module;
  encrypting said unique module identifying code;
  communicating said unique module identifying code from said cryptographic processing module, over a computer network, to said unclassified network database;
  indexing said module unique recovery vector in said unclassified network database using said unique module identifying code;
  encrypting said module unique recovery vector;
  relocating said cryptographic processing module from said classified environment to an unclassified environment;
  subsequent to said relocation, communicating said module unique recovery vector from said unclassified network database, over a computer network, to said unclassified environment; and
  using said module unique data and said module unique recovery vector provided from said unclassified network database to re-initialize said cryptographic processing module in said unclassified environment;
  wherein said module unique data defines second re-initialization data that is required for re-activating said previously deactivated information security functions of said cryptographic processing module and is unique to said cryptographic processing module.

* * * * *